Sept. 9, 1941. T. TOGNOLA 2,255,477
ROTOR
Filed Oct. 6, 1938 2 Sheets-Sheet 1

INVENTOR.
Tullio Tognola
BY
F. Bascom Smith
ATTORNEY

Sept. 9, 1941. T. TOGNOLA 2,255,477
ROTOR
Filed Oct. 6, 1938 2 Sheets-Sheet 2

INVENTOR.
Tullio Tognola
BY F. Bascom Smith
ATTORNEY

Patented Sept. 9, 1941

2,255,477

UNITED STATES PATENT OFFICE 2,255,477

ROTOR

Tullio Tognola, Sidney, N. Y., assignor to Bendix Aviation Corporation, South Bend, Ind., a corporation of Delaware Application October 6, 1938, Serial No. 233,554

4 Claims. (Cl. 171—209)

This invention relates to electrical apparatus and more particularly to a rotor adapted for use in magneto generators and the like.

One of the objects of the present invention is to provide a novel multi-polar magneto rotor which is efficient in operation and simple and rugged in construction.

Another object of the invention is to provide a device of the above character which employs a single magnet block of regular shape which is adapted for economical production.

A further object is to provide a novel multi-polar magneto rotor having laminated pole shoes, the parts of said rotor being assembled and secured together in a novel manner.

A still further object is to provide a magneto rotor that adapts itself to the use of pole shoes in a very efficient manner.

Still another object is to provide a magneto rotor wherein novel means are provided for securing the magnetic flux producing elements of the rotor on a rotatable shaft.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings wherein like reference characters refer to like part throughout the several views, Fig. 1 is a side elevation partly in section and with parts broken away of one form of rotor embodying the present invention;

Figure 1:
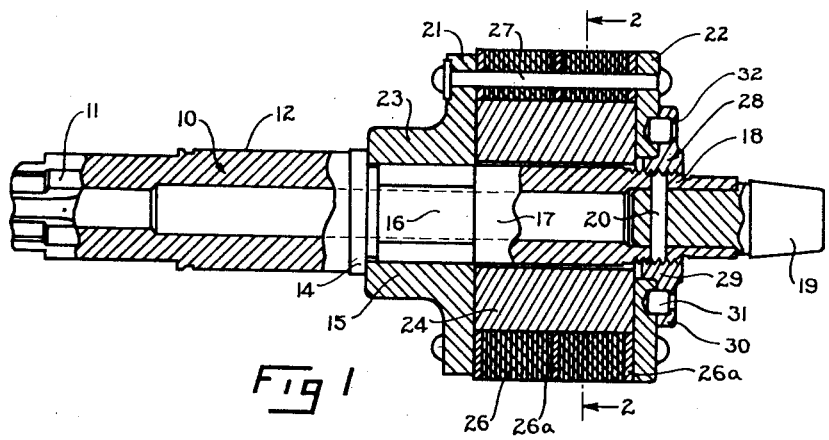
Figures 2, 3:
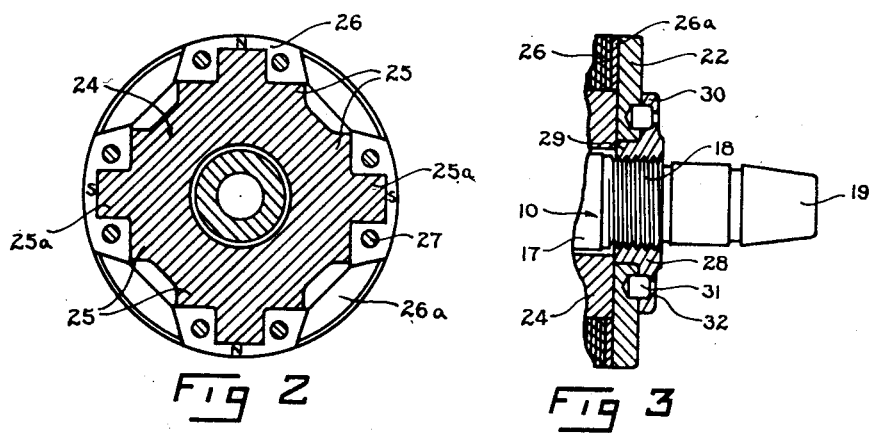
Fig. 2 is a transverse section taken substantially on line 2—2 of Fig. 1.
Fig. 3 is a detail side elevation partly in section and with parts broken away of one end of the rotor shown in Fig. 1.

In the embodiment illustrated in Figs. 1 to 3, by way of example, the novel rotor comprehended by the present invention is mounted on a shaft 10 which is preferably hollowed out and is comprised of any suitable non-magnetic material. Said shaft may be splined as at 11 to provide a driving connection with a suitable prime mover (not shown) and is provided with a smooth bearing surface at 12 whereby the shaft may be rotatably journalled in a magneto casing or the like.

Shaft 10 has a collar 14 formed integrally therewith and a reduced portion 15 adjacent bearing surface 12, said reduced portion having one or more flat surfaces 16 for a purpose to hereinafter appear. The remainder of said shaft comprises a further reduced portion 17 and a threaded portion 18. A stub shaft or cam carrier 19 may extend into the hollow end portion 18 and be secured therein by a pin 20 that passes through the stub shaft and the threaded portion of shaft 10.

The rotor parts are assembled and secured together and to shaft 10 in a novel manner which insures efficient operation, economical production and long life. In the form shown in Fig. 1, the magnetic field producing elements of the rotor are novelly secured together by means including a pair of non-magnetic end plates or members 21 and 22 the former of which has a hub portion 23 with a central bore that conforms to the flat face portion 15, 16 of shaft 10. Member 21 is thus constrained to rotate with said shaft and is held against axial movement in one direction, i. e. to the left, as viewed in Fig. 1, by collar 14. End member 22 is formed as a ring having an internal diameter somewhat greater than the diameter of shaft portion 18 and an external diameter similar to that of member 21. End members 21 and 22 may be made of any suitable non-magnetic material such as brass or aluminum, for example.

Between said end members and surrounding cylindrical portion 17 of shaft 10 is a symmetrical disk or block 24 of magnetic materal, such as nickel aluminum. The bore through block 24 is slightly larger than shaft portion 17 and the outer periphery is machined to provide a plurality of radially extending projections 25, four such projections being shown in the embodiments illustrated. Block 24 is so magnetized that adjacent projections 25 become magnetic poles of opposite polarity as indicated by the letters N and S which represent north and south magnetic poles respectively.

Magnet 24 is centered about shaft 10 and the efficiency thereof is materially enhanced by a plurality of laminated pole shoes secured between plates 21 and 22 and engaging the poles 25 of the magnet. In the form shown each of said pole shoes is constituted by a plurality of thin laminations 26 of highly permeable material such as soft iron, for example. Said laminations, in the embodiment of Fig. 2, have the inner edges thereof slotted for receiving tongue portions 25a of poles 25 and have aligned openings through which securing bars or rods 27 extend. The ends of rods 27 pass through end plates 21 and 22 and are peened over against the latter to securely hold the parts 21, 22, 26 and 24 together as a unit.

Preferably one or more annular supporting rings or laminations 26a of non-magnetic material, such as stainless steel, are interspersed with the laminations of pole shoes 26 for the purpose of enhancing the strength and relieving the soft iron laminations of the pole shoes of the burden of supporting the entire weight of magnet 24. It will be noted that the outer edges of lamina 26 and 26a are arcuate and concentric with shaft 10.

The above described unit comprising end plates 21 and 22 may be readily and inexpensively assembled and mounted on shaft 10. As heretofore pointed out said unit is held against movement toward the left, as viewed in Fig. 1, by collar 14 and novel means are provided for holding the same against axial movement in the other direction. As illustrated, said means comprise a lock nut or retaining member 28 threaded onto the portion 18 of shaft 10. An axially extending portion 29 of said nut has a close sliding fit with the inner periphery of end plate 22 and a radially extending flange portion 30 of said nut engages the outer face of said end plate. Flange 30 is provided with one or more axially extending openings which register with recesses in plate 22 and receive locking pins 31. When the latter are inserted to the positions illustrated in Figs. 1 and 3, a portion of the flange 30 surrounding the openings therein is peened over as at 32 for holding pins 31 in place to secure nut 28 and plate 22 together and prevent relative rotation therebetween and between said nut and shaft 10. When thus locked together said nut and plate constitute in effect a single retaining and supporting member. It will be noted that pin 20, which secures stub shaft 19 in place, is also retained in position by nut 28.

Figure 4:
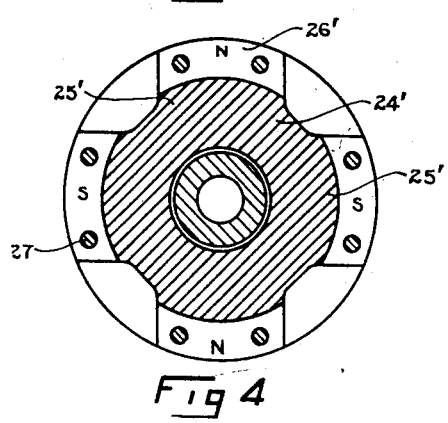
Fig. 4 is a transverse section showing a modification of the magnet and laminated pole shoes.

In the modifications shown in Fig. 4 the projecting north and south poles 25' of magnet 24' terminate in arcuate surfaces and the inner edges of pole shoe laminations 26' are correspondingly shaped. If desired, the periphery of magnet 24' may be perfectly cylindrical.

Figures 5, 6:
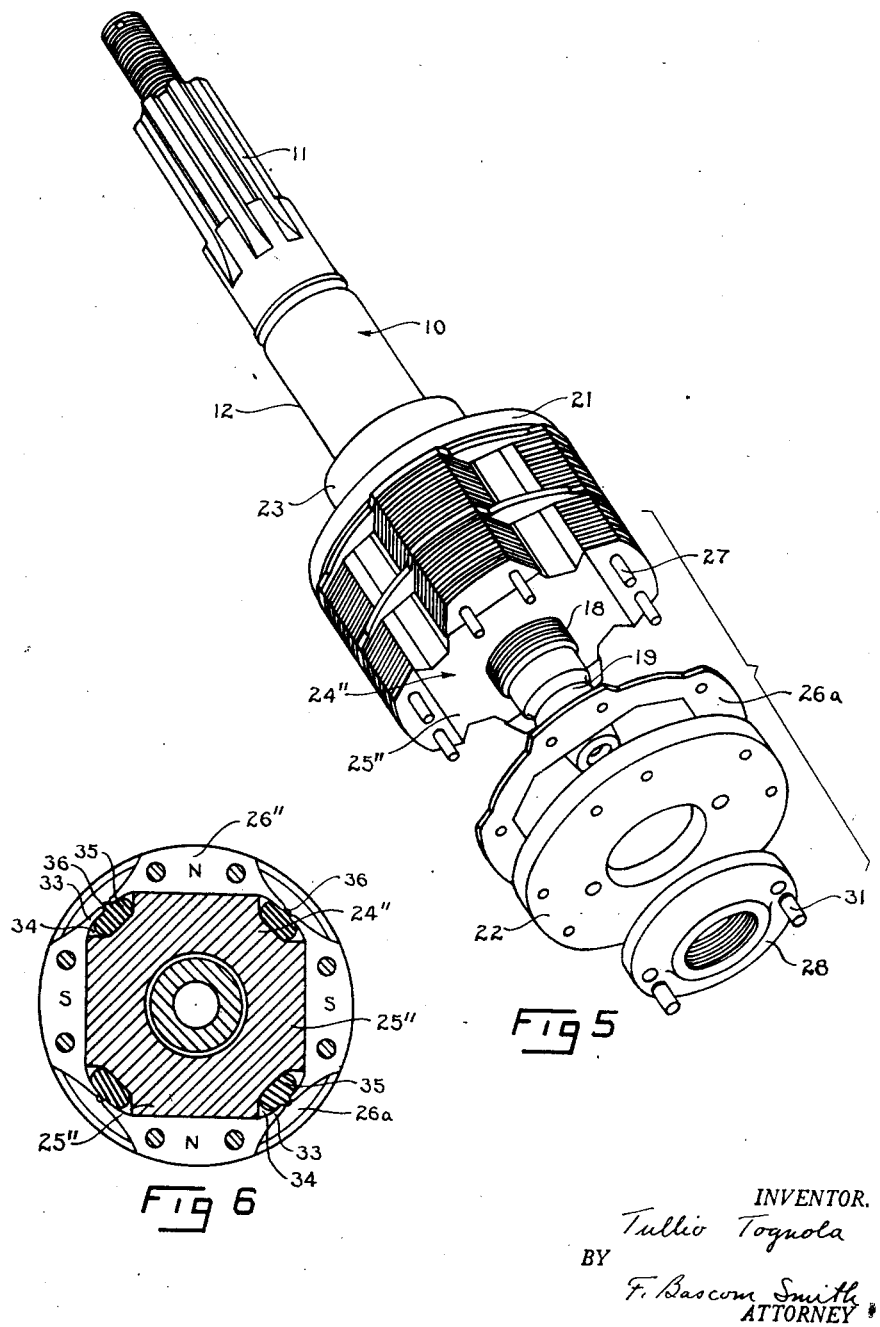
Fig. 5 is an isometric view showing a modified form of the rotor with parts thereof in expanded relation; and, Fig. 6 is a transverse section of a modified form of the rotor shown in Fig. 5.

In the modifications shown in Figs. 5 and 6 the projecting poles 25" of magnet 24" are similar to poles 25 of Fig. 2 but without the tongue or rib portions 25a. The pole shoe lamina 26" may be provided with circumferentially extending tongues 33, as shown in Fig. 6, which approach one another and serve as a flux path between the pole shoes of the rotor. Tongues 33 are effective to more nearly close the magnetic circuit between the poles of magnet 24" and accordingly allow the magnet to retain a larger initial quantity of magnetic flux which, in turn, is capable of generating a larger primary current at low speed. The low speed output of the magneto is thus materially increased. When the rotor is operated at high speed, tongues 33 limit the maximum breaking current due to their flux shunting effect which increases in proportion to increases in speed and counter-electromagnetic force. Wear of the contact points of the magnetos, in connection with which the rotor is employed, is accordingly materially reduced as are also losses occasioned by stray flux. The laminations of the pole shoes shown in Figs. 2, 4 and 5 may also be provided with similar circumferentially extending portions or tongues if desired. Novel means are also provided for use in combination with rotors employing tongues 33, to prevent the accumulation of foreign matter, such as metal shavings, in the axially extending channels 34 formed by said tongues and magnet 24". In the form shown, said means are constituted by elongated elements 35 which fit into said channels and are preferably provided with ribs 36 that extend into and fill the space between adjacent ends of said tongues. Elements 35, 36 may be made of any suitable substance such as felt, rubber or like materials.

There is thus provided a sturdy, durable rotor adapted for use in magneto generators the parts of which rotor may all be readily and inexpensively machined or stamped out and quickly assembled without the exercise of any special skill. The rotor is also adapted to be readily disassembled for inspection, cleaning or repair. The novel construction of the rotor provided by the present invention also assures efficient operation.

Although only a limited number of embodiments have been illustrated and described, it is to be expressly understood that the invention is not limited thereto. Various changes in the design and arrangement of parts illustrated will now be apparent to those skilled in the art and may be made without departing from the spirit and scope of the invention. For a definition of the limits of the invention reference is had primarily to the appended claims.

What is claimed is:

1. In a magnetic rotor, a metallic block having a plurality of projections about the periphery thereof, said block being permanently magnetized so that adjacent projections thereof are magnetic poles of opposite polarity, a pole shoe on each of said projections, each of said shoes having a peripherally extending tongue portion of gradually diminishing thickness on both sides thereof spaced from said block, the adjacent tongue portions of adjacent shoes closely approaching each other, and a yieldable material in the space between adjacent tongue portions and said block, said material covering the gap between the adjacent ends of said adjacent tongue portions.

2. In a magnetic rotor, a permanently magnetized metallic block having circumferentially disposed magnetic poles, adjacent magnetic poles being of opposite polarity, a pole shoe contacting said block at each of said magnetic poles, means for securing said pole shoes in position on said block, each of said pole shoes having peripherally extending tongue portions on two sides thereof spaced from said block, the ends of said tongue portions being relatively thin in a radial direction and the ends of adjacent tongue portions of adjacent shoes being relatively close to each other, and a yieldable non-magnetic material at least partially filling the spaces between said tongue portions and said block.

3. In a magnetic rotor, a permanent magnet having circumferentially disposed magnetic poles, a pole shoe on said magnet at each of said poles, means for securing said pole shoes in position on said magnet, each of said pole shoes having peripherally extending tongue portions on o -posed sides thereof spaced from said magnet, and a yieldable rubber composition at least partially filling the spaces between said tongue portions and said magnet.

4. In a magnetic rotor, a permanent magnet, a pole shoe on said magnet at each of its magnetic poles, means for securing said pole shoes in position on said magnet, each of said pole shoes having peripherally extending tongue portions on opposed sides thereof spaced from said magnet, the adjacent tongue portions of adjacent shoes closely approaching each other, and a resilient non-conducting material, such as rubber, at least partially filling the spaces between said tongue portions and said magnet and extending across the gap between the adjacent ends of said adjacent tongue portions.

TULLIO TOGNOLA.